Figure 1:
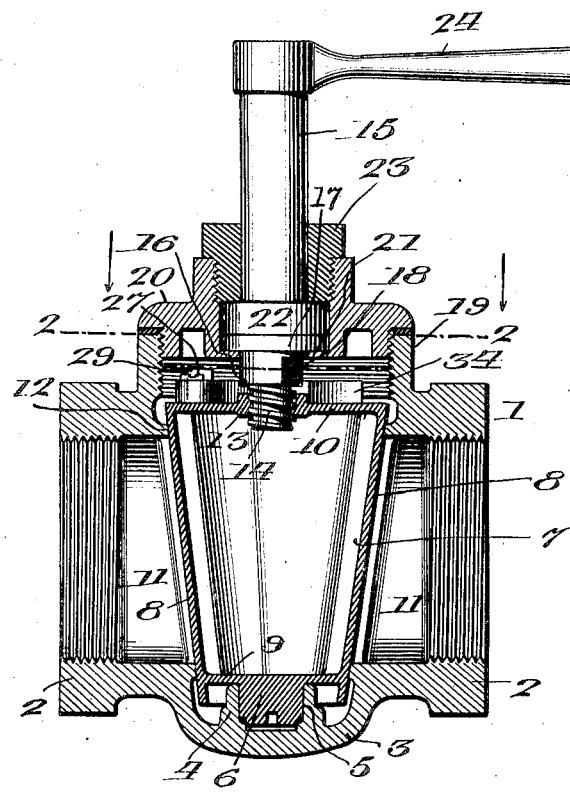

S. A. WHITEHOUSE.
VALVE.
APPLICATION FILED FEB. 26, 1913.

1,084,186.

Patented Jan. 13, 1914.
2 SHEETS—SHEET 1.

WITNESSES
Philip E. Barnes
F. T. Chapman.

Samuel A. Whitehouse INVENTOR

BY

ATTORNEY

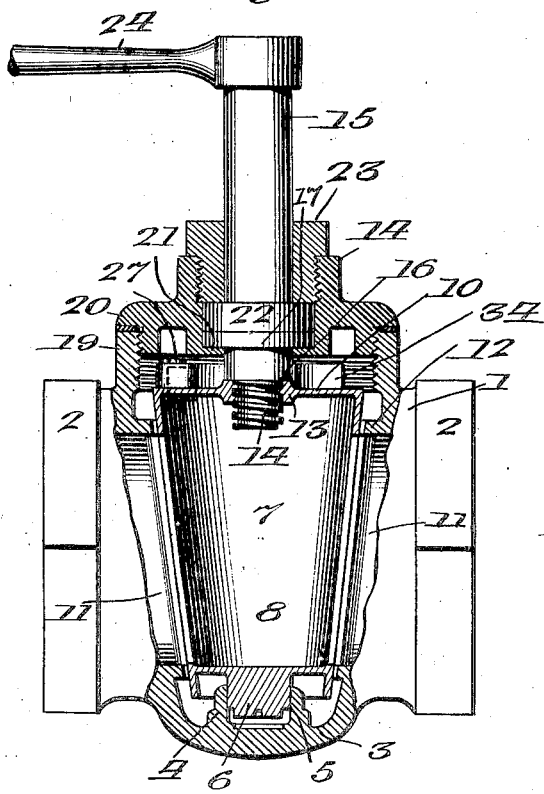
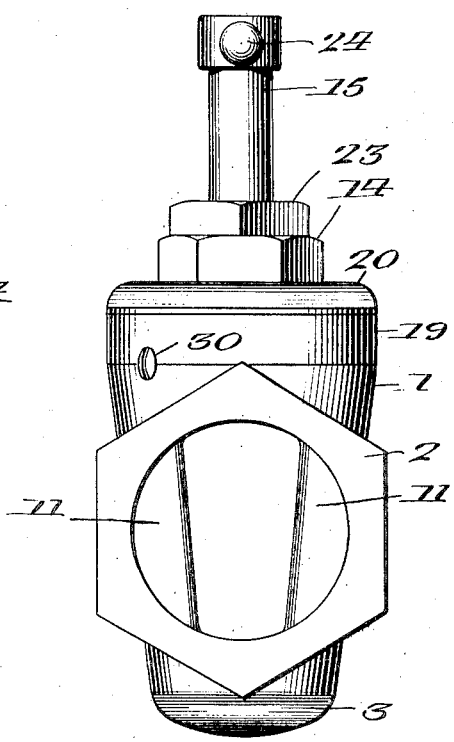
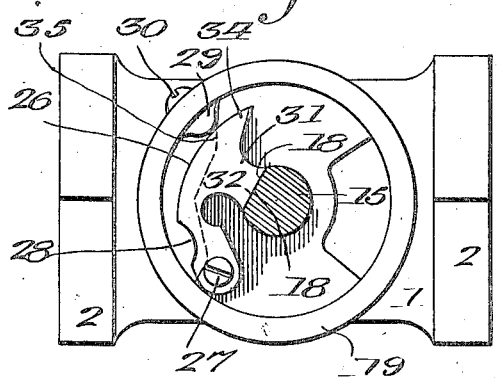
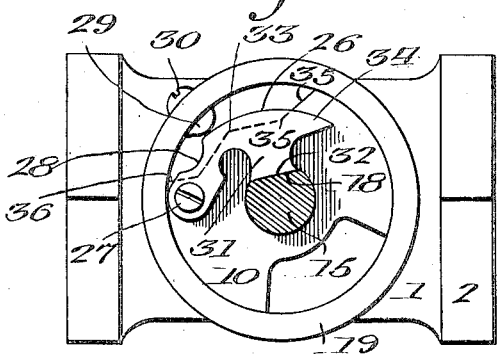

UNITED STATES PATENT OFFICE.

SAMUEL A. WHITEHOUSE, OF CHICAGO, ILLINOIS.

VALVE.

1,084,186.   Specification of Letters Patent.   Patented Jan. 13, 1914.

Application filed February 25, 1913. Serial No. 750,602.

*To all whom it may concern:*

Be it known that I, SAMUEL A. WHITEHOUSE, a citizen of the United States, residing at Chicago, in the county of Cook and State of Illinois, have invented a new and useful Valve, of which the following is a specification.

This invention has reference to improvements in valves, and its object is to provide a valve of very simple construction which shall have the combined advantages of the globe valve, the gate valve, the spigot valve, and others, and at the same time shall avoid some of the disadvantages of such types of valves.

The valve of the present invention has a body member or casing which in general form is common to several types of valves, and the valve also has a manipulating handle and a stem similar to like parts of certain types of valves, while the improved valve has a closing member or valve proper in some respects similar to the ordinary spigot valve, and in other respects similar to a gate valve.

The valve structure of the present invention is provided with a valve member or valve proper rotatable on an axis perpendicular to the direction of flow of fluid through the valve structure, and this valve member is at the same time movable for a short distance lengthwise of its axis of rotation and the arrangement is such that the seat for the valve member is of markedly reduced or limited area. In the improved valve structure the valve member on opening first moves from its seat solely in the direction of the axis of rotation, and when this movement, which need be but a fractional portion of an inch, is completed, the valve member is turned through an arc of about ninety degrees until a passageway provided through the valve member is in line with the ends of the valve casing, thus providing a free passageway through the valve casing and spigot member of a capacity approaching that of a gate valve adapted to a pipe of the same size. The initial movement of the valve member from the full closed position, whereby the valve member is loosened from its seat, is similar in action to that of a globe valve, that is, a rotation of the valve stem through a suitable distance acts by means of a screw to lift the valve member from its seat and this without rotating the valve. This causes the pressure on opposite sides of the valve member to tend to equalize, so that further movement of the valve stem which, because of the peculiar arrangement of the present invention, results in a rotative movement of the valve member, is very easily accomplished, and is not materially interfered with by differences of pressure on opposite sides of the valve. On closing the valve the operation is simply reversed and final contact of the valve member with its seat is accomplished in a manner similar to a globe valve, but the movement is nevertheless similar to that of a gate valve, since there is a wedging of the valve member in its seat. Aside from the valve member or spigot member and the valve stem the improved valve includes but one other movable part which is carried by the valve member and is also capable of independent movement acting somewhat in the manner of a latch. The whole structure is therefore of but a minimum of parts, of very simple construction, and may be operated from full closed to full open position or the reverse by a movement of the valve stem through an arc of only about one hundred and eighty degrees.

The invention will be best understood from a consideration of the following detailed description, taken in connection with the accompanying drawings, forming a part of this specification, with the further understanding that while the drawings show a practical embodiment of the invention, the latter is not confined to any strict conformity with the showing of the drawings but may be changed and modified so long as such changes and modifications mark no material departure from the salient features of the invention.

Figure 3:
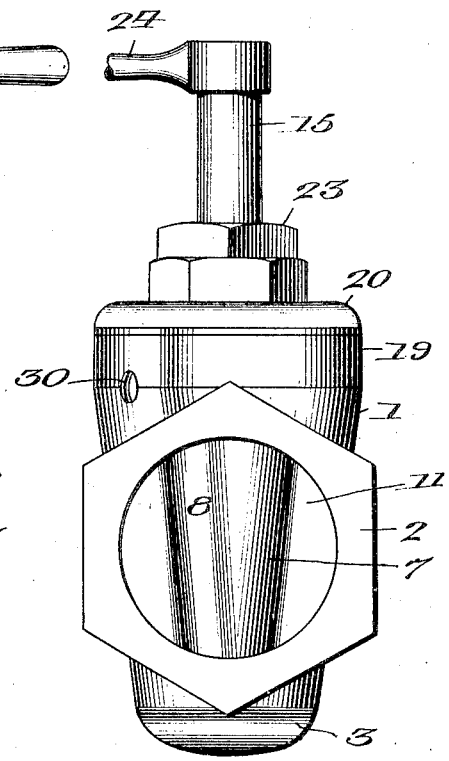
Figure 2:
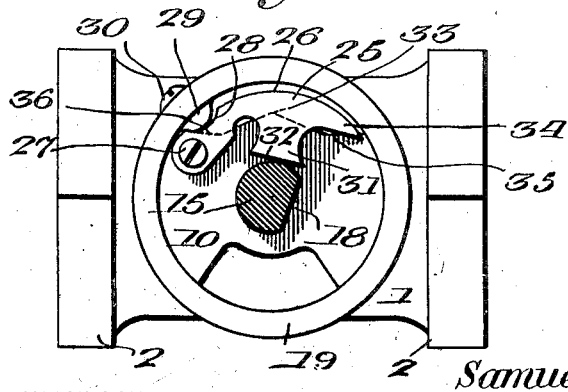
Figure 4:
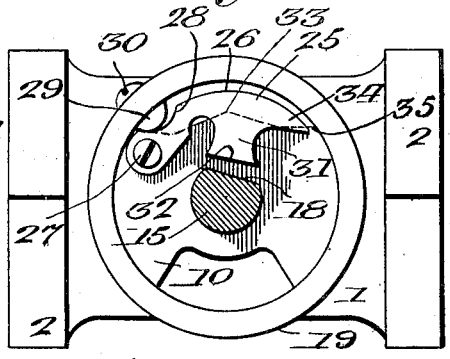

In the drawings:—Figure 1 is a diametric section of the valve structure in the plane of the longitudinal axis of the valve casing with the valve shown in the closed position. Fig. 2 is a section on the line 2—2 of Fig. 1. Fig. 3 is an end elevation of the valve as viewed from the left hand end of Fig. 1 and showing the valve stem turned ninety degrees from the position of Fig. 1. Fig. 4 is a view similar to Fig. 2 but showing the parts in a position corresponding to that of Fig. 3. Fig. 5 is a section similar to Fig. 1 with some parts in elevation, but showing the valve in the full open position. Fig. 6 is an end elevation of the valve as viewed from the left hand end of Fig. 5. Fig. 7 is a section similar to Fig. 2 but with the parts in the position shown in Fig. 5. Fig. 8 is a section similar to that of Fig. 2 but showing the parts in the position assumed during a different phase of the operation from those shown in other views.

In the drawings, there is shown a valve casing 1 which in external form may be similar to that of the ordinary globe valve and is provided with the usual internally threaded terminal necks 2 for the attachment of the valve structure to pipes. However, the construction of the improved valve permits the formation of the body of the casing considerably thinner than is customary in globe valves.

For convenience of description, it may be considered that the valve structure is installed in an upright position and attached to horizontally disposed pipes, so that terms of position may be used with respect to the valve as so installed. With this understanding there is a rounded out portion 3 at the bottom of the valve casing intermediate of the necks 2, and at the central part of this rounded out portion there is an internal hollow stud or boss 4 opening upwardly and forming a guiding seat 5 for a central or axial stud 6 on the lower end of a valve member 7, which valve member is of the tapering or spigot type from the upper wider end toward the lower narrower end, which latter is provided with the stud 6. This spigot valve member comprises two oppositely disposed conical segments 8 joined by terminal heads 9, 10, respectively, so that there is a passage of large area completely through the valve member 7 in a direction perpendicular to the longitudinal axis of the valve member and substantially as high as the distance between the heads 9 and 10. A similar passage is formed through the valve casing in line with the necks 2 by tapering internal walls 11 at the longitudinal edges of which and at the upper and lower ends of the spaces defined by these walls are narrow valve seats 12 which need no further description, since they do not in themselves enter into the present invention, which is directed more particularly to certain operating structures for the valve member. It may be stated, however, that the valve seats are so disposed as to engage the valve member 7 close to the margins of the conical segments 8, when the valve is in the closed position, so that while forming a most efficient closure but a minimum of resistance is offered to the movements of the valve member 7 into and out of seating position.

Centrally of the head 10 there is formed a boss or enlargement 13 which is internally threaded for the reception of a threaded terminal portion 14 of a valve stem 15, which stem where the terminal portion 14 merges into it is of larger diameter than such terminal portion to provide a radial shoulder 16, which, when the threaded terminal portion or extremity 14 is screwed into the head 10, abuts the enlargement 13. At a short distance from the threaded portion 14 the stem has formed thereon a radial flange 17 and between this flange and the terminal portion 14 the stem has a flattened part 18 in chord relation to said stem, which latter, following the usual practice, is cylindrical.

At the top of the casing, that is, diametrically opposite from the rounded out portion 3, there is an internally threaded neck 19 into which is screwed a bonnet 20 having the usual supporting flange 21 engaged by the valve stem flange 17 and containing the usual packing ring 22 surrounding the valve stem and held in place by the usual gland 23. The stem 15 is shown as provided with a manipulating handle 24, but this is to be taken as simply indicative of any suitable manipulating means, the handle answering the purposes of the present invention since the entire rotative movement of the valve stem need not exceed about one hundred and eightly degrees, wherefore the handle becomes more or less indicative of the position of the valve member 7 whether open or closed.

Mounted on the head 10 is a latch member 25 in the general form of a curved arm having one edge 26 approximately concentric to the axis of rotation of the valve stem, and at one end this arm is pivotally connected to the head 10 on what may be termed the upper face thereof by a pivot screw 27, or other suitable device which will permit the latch member 25 to turn freely about it and yet hold it to the upper face of the head 10. Adjacent the pivot 27 the edge 26 of the latch member has a notch or recess 28 formed therein, and usually this notch or recess is curved. Either formed on or attached to the inner wall of the neck 19 in the path of the curved edge 26 of the latch member 25 is a stud or block 29. This stud 29 may be secured in place by a screw 30 or may be cast on the neck or be otherwise provided for, but as this stud may, in the course of time, become worn and may not have as long a life as the rest of the parts, the detachability of the lug permits its renewal at any time at a negligible cost.

The latch member 25 has formed on that edge remote from the edge 26 a nose or projection 31 having its outer face 32 where conforming to the plane face 18 formed on that portion of the valve stem immediately adjacent to the threaded extremity 14 and its straight or plane face 32 is related to the face 18 of the valve stem to make flat engagement therewith under circumstances to be described, while at the same time the nose or projection 32 is so related to the pivot 27 that the latch 25 may move away from the stem 15 when properly positioned to permit the stud 29 to enter the recess 28, in which case the plane face 32 of the nose 31 will engage the rounded wall of the stem 15 adjacent the threaded terminal portion 14.

Considering now the position of the parts of the valve shown in Figs. 1 and 2 it is to be observed that the valve member 7 is so situated that the conical segments 8 are in closing relation to the passage through the valve and are, moreover, in firm engagement with the valve seats 12, the member 7 being in its position of closest approach to the rounded end 3. Under these circumstances the threaded end 14 is unscrewed for an appropriate extent from the boss 13, and the shoulder 16 is removed for a distance from the boss 13, it being understood that while the stem 15 is capable of rotative movements in the bonnet 20 it has no axial movement therein, or with relation to the valve casing. The latch 25 has the nose 31 opposite the cylindrical portion of the lower end of the valve stem immediately adjacent the shoulder 16, and the stud 29 is in entering relation to the recess 28, thus permitting the latch 25 to move toward the inner wall of the neck 19. The latch 25 does not depend entirely upon the pivot 27 to support it, but the nose 31 may rest upon the head 10 and the latter may be radially prolonged, as indicated at 33, and the latch 25 may also be prolonged, as indicated at 34, to form extended supporting means for the latch on the head.

Now let it be assumed that the handle 24 is moved away from the observer, as shown in Fig. 1, then the stem 15 is moved counter-clockwise, as viewed in Fig. 2. However, the latch 25 because of the engagement of the stud 29 in the recess 28 cannot move and the valve member 7 can, therefore, not rotate, but the threaded end 14 of the stem 15 will screw into the boss 13 and since the stem 15 cannot move axially, the valve member 7 must move axially with relation to the valve casing, thus lifting the valve member 7 from its seat, and because of the conical formation of the valve and its seat, the valve is consequently loosened and may be loosened to such an extent that fluid engaging one side of the valve will flow between the loosened valve and its seat to the other side, thus to an extent tending to equalize pressures. The valve member 7, however, is still guided by the threaded terminal portion 14 and the stud 6.

The stud 29 is shown as rounded and the recess 28 is also shown as curved or rounded, so that the tendency of the stud 29 is to force its way out of the rounded recess or seat 28 and in doing so move the latch 25 about the pivot support 27, thus directing the nose 31 toward the axis of the valve stem 15. So long as the rounded peripheral portion of the valve stem is in engagement with the nose 31 the latch 25 is held against any movement about its pivot 27. The flat portion 18 of the valve stem is so related to said valve stem that by the time the valve stem has turned about ninety degrees this flat portion is brought opposite the flat or plane face 32 of the nose 31 and then there is no longer any resistance offered to movement of the latch 25 under the escaping effort of the lug or stud 29 with respect to the recess 28, and hence even before the parts reach the position shown in Fig. 4 the lug 29 has forced the latch 25 so that its nose 31 is in engagement with the plane or flat portion 18 of the stem 15. Moreover, the shoulder 16 has in the meantime reached the boss 13, and since the valve member 7 cannot rise any farther because of engagement with the shoulder 16 a further turning movement of the valve stem causes a like turning movement of the valve member 7, which movement finds no resistance so far as the latch member is concerned. When the valve member is raised or unseated it is carried so that the head 10 has an edge portion 35 thereof in the path of the stud 29, and when the valve member 7 is rotated by the final movement of the handle 24 this movement is ultimately arrested by the engagement of the edge portion 35 of the head with the stud 29, and this arrested movement, illustrated in Fig. 7, is such that the passage through the valve member 7 is coincident with the ends of the valve casing, thus causing the valve to be fully open. The opening movement of the valve takes a movement of the handle through an arc of about one hundred and eighty degrees.

Suppose, now, that it is desired to close the valve. The handle 24 is moved in a reverse direction to that already described, and since the stud 29 is now in engagement with the peripheral edge 26 of the latch 25 the nose 31 is maintained in engagement with the flattened or plane face 18 of the valve stem 15, wherefore the valve member 7 is constrained to rotate with the valve stem and this rotative movement continues in a clockwise direction, as viewed in Fig. 8, to a point beyond the position shown in Fig. 8 until an edge portion or shoulder 36 of the head 10 comes into engagement with the stud 29, thus arresting further rotative movement of the member 7. However, a further rotative movement of the valve stem in the same direction as just assumed will cause the flattened portion 18 to act upon the flattened face 32 of the nose 31 in the manner of a cam and as the stud 29 is now opposite recess 28 no resistance is offered to the movement of the latch 25 on its pivot 27 away from the axis of the stem 15, thus permitting further rotative movement of the stem 15 without interference from the latch 25. However, the stud 29 holds the valve 7 against rotative movement in a clockwise direction, as viewed in Figs. 2, 4, 7 and 8, and the threaded end 14 of the stem 15 will unscrew from the boss 13, thus causing the valve member 7 to move toward the rounded out portion 3 of the casing until the valve member 7 is seated with the segments 8 in closing relation to the passage through the valve casing.

It will be seen, therefore, that the valve structure of the present invention comprises but three moving parts, one of which is the valve stem, the second of which is the valve member 7 and the third of which is the latch member 25 carried by the valve member 7. Furthermore, the valve has the quick opening and closing movements of the ordinary spigot valve with the large area of opening and the ease of opening and closing of the gate valve with the seating and unseating of the valve similar to that of a globe valve, while providing a manipulating movement of but a small fractional portion of that required by either globe or gate valves of ordinary construction. While the spigot valve may be opened and closed with but half the movement of the valve of the present invention, the movable spigot valve member is always in full frictional engagement with its seat whether in the open or closed position and offers comparatively great resistance to manipulation. While the extent of movement of the present valve is greater than that of the spigot valve the exertion necessary to open and close the valve except at the final seating or the initial unseating is entirely negligible. Moreover, the amount of wear between the valve and its seat in the present invention is practically negligible, while that refinement of finish necessary to make a fluid tight fit in a spigot valve is entirely avoided.

For convenience of description the valve member 7 may be termed a rotatable plug or spigot valve or a rotatable tapering skeleton plug or spigot valve, while the entire device may be termed a valve structure.

What is claimed is:—

1. In a valve structure, a casing, a rotatable valve member mounted therein for movement in the direction of its axis of rotation, a rotatable valve stem entering the casing and held against movement in the direction of its axis of rotation, said stem being connected to the rotatable valve member for imparting both axial and rotative movements thereto, and a pivoted latch member mounted directly upon that end or head of the rotatable valve member to which the valve stem is connected, said casing and valve stem being constructed to coact with the latch member to lock the valve member to the stem and to release it therefrom at predetermined points in the rotative movement of the valve stem.

2. In a valve structure, a valve casing, a rotatable tapering valve member mounted therein for movement in the direction of its axis of rotation and provided at the larger end with a head having a screw-threaded part, a rotatable valve stem mounted on the casing and held against longitudinal movement and entering the casing and there provided with a threaded end coacting with the screw threaded part of the rotatable valve member, a pivoted latch mounted directly upon the larger end of the rotatable valve member, and a stop member carried by and within the valve casing in the path of the latch, said latch and valve stem being shaped to coact, and the latch being also shaped to coact with the stop member to cause the latch to lock the valve member to the stem during a portion of the rotative movement and to release the valve member from the stem during another portion of the rotative movement of the latter.

3. In a valve structure, a casing, a rotatable valve member mounted therein for movement in the direction of its axis of rotation, a rotatable valve stem mounted on and extending into the casing and held against movement in the direction of its axis of rotation, said stem being connected to the rotatable valve member for imparting both axial and rotative movements thereto, a pivoted latch member mounted directly upon that end or head of the rotatable valve member to which the valve stem is connected, and a stop member within the casing in position to engage the pivoted latch member, said rotatable valve member being also shaped to engage the stop member for limiting rotative movements of said valve member.

4. In a valve structure, a rotatable tapering valve member having a movement in the direction of its axis of rotation, a rotatable valve stem held on the valve structure against longitudinal movement and provided with a screw threaded connection with the valve member to cause the longitudinal movement of the latter, said valve stem having a flattened portion in chord relation to the axis of rotation and adjacent the threaded portion of the valve stem, and a pivoted latch member carried by the rotatable valve and having a nose shaped and located for engagement with the flattened portion of the valve stem and adjacent its pivot provided with a recess, the valve structure being provided with a relatively fixed stop member in position to engage in the recess of the latch member and also to engage said latch member to hold it in locking relation to the flattened portion of the valve stem.

5. In a valve structure, a rotatable valve member having a passage through it perpendicular to the axis of rotation and provided with oppositely disposed walls, said valve structure including a casing provided with seats for the valve member and the latter being movable in the direction of its axis of rotation with both the valve member and casing provided with coacting parts for guiding the valve member during its longitudinal movement, a rotatable valve stem carried by the casing and held against longitudinal movements and threaded into the valve member in the direction of its axis of rotation for causing the longitudinal movements of the valve member and said stem having a cylindrical portion adjacent the threaded portion with a flattened part in chord relation to the cylindrical portion, and a latch member pivoted near one end to the valve member, said latch member having a curved edge with a notch therein adjacent the pivot and on the side remote from the curved edge provided with a nose having a face coinciding with the flattened portion of the valve stem, the valve casing being provided with a stop adapted to engage the curved face of the latch and also engage in the notch of the latch and related to the valve member to limit the rotative movement of the latter.

6. In a valve structure, a valve casing, a rotatable valve member therein movable in the direction of its axis of rotation, means for imparting longitudinal and rotative movements to the valve member, and a latch and coacting parts within the casing, said latch participating in the movements of the valve member and mounted directly upon the larger end or head thereof and in turn movable toward and from the axis of rotation of said valve member.

7. A valve comprising a suitable casing, a rotatable spigot valve member mounted therein and having a movement in the direction of the axis of rotation for seating and unseating the spigot member, and the rotatable movements being limited in extent to open and close the passage through the valve structure, a valve stem having a rotative movement equal to the rotative movement of the rotatable member and a fractional turn in addition thereto to cause the seating and unseating of the valve member, and a latch member for coupling the valve stem to the valve member and uncoupling it therefrom, said latch member being located within the casing and mounted directly upon the larger end or head of the rotatable valve member and participating in the movements of said rotatable valve member and also having an independent range of movement toward and from the axis of rotation of the rotatable valve member into and out of engagement with the valve stem.

In testimony, that I claim the foregoing as my own, I have hereto affixed my signature in the presence of two witnesses.

SAMUEL A. WHITEHOUSE.

Witnesses:
JOHN T. BRULIS,
HENRY F. THUMANN.